March 20, 1956 E. H. BROWN, JR., ET AL 2,739,083

ELECTRICALLY CONDUCTIVE MATERIAL

Filed Nov. 8, 1951 3 Sheets-Sheet 1

INVENTORS
Edgar H. Brown Jr.
Encel H. Dodge
Johan Bjorksten
AGENT

INVENTORS
Edgar H. Brown Jr.
Encel H. Dodge
Johan Bjorksten
AGENT

March 20, 1956 E. H. BROWN, JR., ET AL 2,739,083

ELECTRICALLY CONDUCTIVE MATERIAL

Filed Nov. 8, 1951 3 Sheets-Sheet 3

INVENTORS
Edgar H. Brown Jr.
Encel H. Dodge
Johan Bjorksten
AGENT 2,739,083

ELECTRICALLY CONDUCTIVE MATERIAL

Edgar H. Brown, Jr., Cambridge, Mass., and Encel H. Dodge and Johan A. Bjorksten, Madison, Wis.; said Brown and said Dodge assignors to Bjorksten Research Laboratories, Inc., a corporation of Illinois Application November 8, 1951, Serial No. 255,386
8 Claims. (Cl. 117—211)

This invention relates to surfaces of controlled conductivity, and more particularly, to new means of rendering transparent and other surfaces conductive to electricity to a precisely limited degree.

Heretofore, it has been difficult to make surfaces conductive to a precisely controlled extent, without affecting or modifying the underlying solid materials, and it has been impossible to make surfaces so conductive without destroying the transparency of the material treated.

Problems which have been particularly pertinent in this connection have been the problems of dissipating static charges from transparent surfaces such as aircraft glazing, the problem of shielding fluorescent lights to radio without impairing the light transmission, and the problem of heating and defogging windshields.

In the past it has been attempted to deal with these problems by applying, for example, extremely fine or light metal deposits to the base materials. Where the base material was a plastic, such metal deposits were extremely difficult to adhere, because of the differential expansion on changes of temperature between metals and plastics. Also, where transparent metal oxides were employed, the same difficulty existed.

Furthermore, if metal was deposited to a base material by any of the known methods, including vapor application in vacuum, mirror deposit, plating, or spraying, then if the metal deposit was reduced to the point of transparency, conductivity ceased.

In accordance with the present invention, we cause scratches to be formed in the base coating, and then fill these scratches with a conductive substance, and we may, but do not necessarily have to, subsequently seal them in by deposit of a thin electrically penetrable coating adherent to the base material. These scratches may be minute and invisible to the naked eye.

The invention is further illustrated by the following specific examples:

*Example 1*

A sheet of polymethyl methacrylate was rubbed lightly with a mixture of equal parts of silicone carbide, 325 grit, and corn starch. This rubbing was continued by hand lightly for 30 seconds. The silicone carbide starch powder was then blown away by means of an air jet, and the surface was rubbed with cotton cloth, sprinkled with "Dixon 200–09" graphite.

The use of this particular grade of graphite is not mandatory, inasmuch as almost any kind of reasonably pure graphite will flake and pack under pressure, sufficiently to fill the scratches.

After one minute rubbing by hand of the graphite, the resistance was tested and was found to be 100 megohms. Rubbing continued for another minute, at which time the resistance was found to be 5 megohms. This was in the range desired in this particular application, which was for disseminating static, and the plastic sheet was then wiped off with a clean rag for removal of excess graphite and used. The light transmission was 86%; in other words, it was transparent enough for any normal practical purposes.

*Example 2*

A sheet of plate glass was rubbed with a suspension of fine diamond dust with a chamois skin for 30 seconds by hand in circular motion. The diamonds were removed by washing and the plate dried. It was then rubbed with a mixture of flake graphite and silver powder 2:1. The resistance was 2 megohms.

*Example 3*

One half of the glass plate of Example 2 was coated with a .0001 inch coating of nitrocellulose in ethyl acetate. This nitrocellulose coating adhered to glass and sealed in the conductive lines in the scratches. The coating was sufficiently thin to be electrically penetrable and thus not to interfere appreciably with the static dissipating efficacy of the treatment.

*Example 4*

A sheet of injection molded polystyrene was rubbed 30 seconds with a mixture of 600 grit boron carbide and corn starch, in proportion 1:2. The sheet was then blown clear of remaining traces of this abrasive compound and was rubbed intensely for 5 minutes with colloidal graphite. The resistance was 50,000 megohms and the transparency was sufficient to permit use as a shielding surrounding fluorescent lighting, in order to screen out radio disturbance from these lights.

*Example 5*

A glass plate was rubbed with 10-mesh sapphire grit and subsequently with powdered lead. It was then coated with a coating of silicic oxide by vacuum evaporation, and flash heated sufficiently to melt the lead so as to cause a continuous conductance in the scratches. The resultant glass plate had a conductance of only 10 ohms and could be heated for defogging.

*Example 6*

A sheet of polymethyl methacrylate-polyvinyl butyral sandwich laminate, having outward surfaces of polymethyl methacrylate and inner layer of polyvinyl butyral, was rubbed 30 seconds with a mixture of equal parts of silicone carbide, 400 mesh, and corn starch. The abrasive powder was then blown off by a jet of compressed air. The plastic was then rubbed rapidly 10 seconds with a woolen cloth, and was then rubbed with a cotton cloth, dusted with graphite, for 90 seconds. After this period measurements showed it to have a resistance of 25 megohms. A portion of the sheet was then coated with a polyelectrolyte solution described below, and the other portion of the sheet was similarly rubbed for an additional 30 seconds. The conductance was then ½ megohm. This coating was also then coated with the polyelectrolyte by spraying, so that a coating having a thickness of about .001 inch was applied. The polyelectrolyte solution in question has the following composition:

| | | |
|---|---|---|
| Cyclohexanone | mols | 2 |
| Methylmethacrylate monomer | do | 1 |
| Methacrylic acid | do | .2 |
| Benzoyl peroxide | percent | .2 |

The above ingredients were refluxed 1 hour at 137–138 degrees C., then abruptly cooled in ice water.

The resistance of this sheet after application of the coatings was 1 megohm, and the transparency was 92%. The sheet was then blown to form a semi-spherical dome. After this blowing and drawing operation, the conductivity was 2½–3 megohms.

*Example 7*

An aluminum panel was covered with a .1 inch thick coating of polystyrene firmly bonded thereto by means of cement which was a resorcinol aldehyde condensation product. This layer of polystyrene was scratched by rubbing with 325 grit silicone carbide for 3 minutes by hand. The silicone carbide was removed by blowing and light wiping, whereupon the surface was rubbed with cotton cloth for 30 seconds. After this preparation, the surface was rubbed with a mixture of equal parts of silver powder and graphite, for 5 minutes, whereupon the graphite was sealed in by a .001" thick layer of a material commercially sold under the trade name of "Logoquant" by the Bee Chemical Company, Chicago, comprising a polymerized aliphatic ester of methacrylic acid dissolved in a solvent and believed to be described in the U. S. Patent No. 2,578,665 issued December 18, 1951, in application Serial No. 730,192 filed February 21, 1947. The resultant coating had a resistance of 377 ohms.

*Example 8*

A sheet of polymethyl methacrylate was rubbed unidirectionally by means of a belt sander, by application of 620 grit aluminum oxide. After 10 seconds' contact with the sander belt, the abrasive was blown off with compressed air, and the surface was again rubbed unidirectionally in the same direction as the scratching with a graphite also applied by means of a clean sander belt. The coating was sealed by means of roller application of the polyelectrolyte lacquer made in the following manner:

| | | |
|---|---|---|
| Diethylene glycol monoethylether acetate | mols | 2 |
| Methyl methacrylate monomer | do | 1 |
| Methacrylic acid | do | .2 |
| Benzoyl peroxide | percent | .2 |

The above ingredients were refluxed for 1 hour at 137–138 degrees C. The resultant product, after the refluxing period, was cooled rapidly in a bath of ice water.

This sample had a resistance of ½ megohm in the longitudinal direction and 5000 megohms in the crosswise direction.

*Example 9*

A sheet of glazed porcelain was rubbed unidirectionally by means of a belt sander, by application of 620 grit aluminum oxide. After 10 seconds contact with the sander belt, the abrasive was blown off with compressed air, and the surface was again rubbed unidirectionally in the same direction as the scratching with a graphite also applied by means of a clean sander belt. The coating was sealed by means of roller application of the polyelectrolyte lacquer made in the following manner:

| | | |
|---|---|---|
| Diethylene glycol monoethylether acetate | mols | 2 |
| Methyl methacrylate monomer | do | 1 |
| Methacrylic acid | do | .2 |
| Benzoyl peroxide | percent | .2 |

The above ingredients were refluxed for 1 hour at 137–138 degrees C. The resultant product, after the refluxing period, was cooled rapidly in a bath of ice water.

This sample had a resistance of 18,000 ohms in the longitudinal direction and 5000 megohms in the crosswise direction.

While reference has been made specifically to certain ohm ranges, it is found that basically the resistance ranges covered by this invention vary from about 10 ohms to about 1000 megohms. In applications aiming toward dissipation of static, we prefer to work in a range from 1 to 10 megohms, although some results may be obtainable within the range 250,000 ohms to 25 megohms.

For purposes of screening out radio noise from fluorescent lights, we prefer to operate within the range of 100 to 50,000 ohms, and particularly within the range of 500 to 30,000 ohms.

The surface resistance of 377 ohms per square inch has proved particularly advantageous for certain shielding applications and for non-reflective walls. For heating and defogging, we prefer to employ resistance in the range, 10 to 200 ohms, and particularly 25 to 150 ohms.

All of these resistances can be obtained by application of the techniques described. To obtain the scratching it is not absolutely necessary to apply specifically a known abrasive, because rubbing with certain commercial products such as, for example, rough paper toweling or even so-called "Kleenex" will result, if persisted in, in a sufficient amount of scratching to make possible the application of the invention for resistances in the higher megohm ranges.

Any known abrasive harder than the base material to be treated may be employed for purposes of this invention. Such abrasives are, for example, aluminum oxide, ferric oxide, silicon carbide, boron carbide, emery, silicon oxide, diamond, calcium carbonate, strontium phosphate, allanite, ampangabeite, antimony, buszite, caryocerite, kishtimite, nivenite, petalite, priorite, and yttrotitanite.

While we prefer to rub in graphite as a separate operation, the graphite could be applied concurrently with the abrasive rubbing.

Instead of graphite, we may employ any other conductive substance such as oxide of tin, titanium metal, ductile metals generally, such as, for example, powders of silver, antimony, lead, tin and the like, and generally conductive solids in powdered state.

It is not absolutely necessary for the invention, to seal in these powders, inasmuch as, for example, graphite hard packed in scratches will resist considerable surface erosion before changes in the conductivity occur. However, for best results, we prefer to seal the material with a polyelectrolyte, a polymer of strongly acid or basic monomer, which should have a resistance less than about 7000 megohms.

However, so long as the current involved can penetrate the coating, it is not absolutely necessary to have the coating conductive. A very thin non-conducting coating applied to the surface can be penetrated by electrical sparks so that it will behave as if it were conductive because of this penetration, even though in itself, its resistance may be almost infinite.

Therefore, a thin film of electrically penetrable material adherent to the base material can be used to seal in the conductor regardless of the conductivity of the said electrically penetrable coating.

For application of conductors having relatively high conductivity and relatively coarse scratches, particularly for making glass or ceramic articles conductive, we prefer to apply a metal melting below 1100 degrees C. as the principal ingredient in the scratches. Such metals are, for example, lead, bismuth, aluminum, silver, gold, and their alloys, copper and the like. If one of the less noble of these metals is employed, the use of a sealing coating becomes highly desirable, unless a very short term utility of the coating is contemplated.

As a practical application of the surface which has parallel scratches and is thus conductive in one direction only, and non-conductive in the other, it is contemplated that such material might be used for polarizing electromagnetic waves, and it could also be used for a precise resistance regulating device if at least two electrical conductors were placed in contact with such a parallel scratched surface, the area of contact between said scratches and at least one of the electrical conductors being variable at will, for example, by sliding the contacts transversely to the direction of the scratches or by turning a circular plate carrying the conducting parallel scratches.

In addition to having the conductive material sealed in place by means of a lacquer-like plastic solution, which in addition to the aforesaid polyelectrolytes, may also consist of other polyelectrolytes, such as polymers of vinylpyrrolidon hydrochloride, acrylic acid, and other polyelectrolytes as discussed, for example, in the publications of R. M. Fuoss and his co-workers in the Journal of Polymer Science, and elsewhere, these coatings permit sufficient electricity for our purposes to pass because of their conductivity, which, though insufficient in itself, even to dissipate static, will still suffice to carry the charges down to the conductive scratches. As another modification of the invention, we may also employ other electrically penetrable coatings, which, though non-conducting, become perforated by the electric charges, and thus permit the charges to penetrate to the conducting layer. Such coatings may be composed of, for example, cellulose acetate, polystyrene, polyvinylidene chloride, polyvinyl chloride, silicon containing resins, fluoro resins, such as polychloro trifluoro ethylene, polytetrafluoro ethylene, polyacrylic materials, alkyds, and co-polymers of any or all of the above, butyl titanate, and the like, and briefly, any kind of electrically penetrable film former. We may also apply a protective coating of a wax-type substance, such as, beeswax, carnauba wax, hydrogenated castor oil, chlorinated phenols, and the like. This imparts to the article a resistance intermediate between that of the lacquer-like coatings and complete lack of protection.

While it is our belief, that the conductivity is principally due to the conductive material lodged or imbedded in the scratches, it is possible that conductivity is also due to transparent films of compressed graphite, firmly adherent to the surface of the base materials.

The invention is further illustrated by the drawings, of which Figures 1, 3, 5, 6 and 7 are sectional side views, and Figures 2, 3 and 4 are perspective views showing both top and side surfaces.

Figures 1 and 2 show a transparent sheet material which may be a transparent form of plastic material or a glass 1, which is rendered electrically conductive by the presence of surface scratches 2, filled with a conductive material such as graphite, silver oxide, etc. This may be sealed in by means of an electrically penetrable or conductive surface coating 3.

In Figure 2 the scratches have been formed by rubbing in two directions, and in Figure 3 by circular rubbing. In Figure 4 a substantially unidirectionally surface conductive sheet is shown in which the scratches are parallel.

Figures 1, 2:
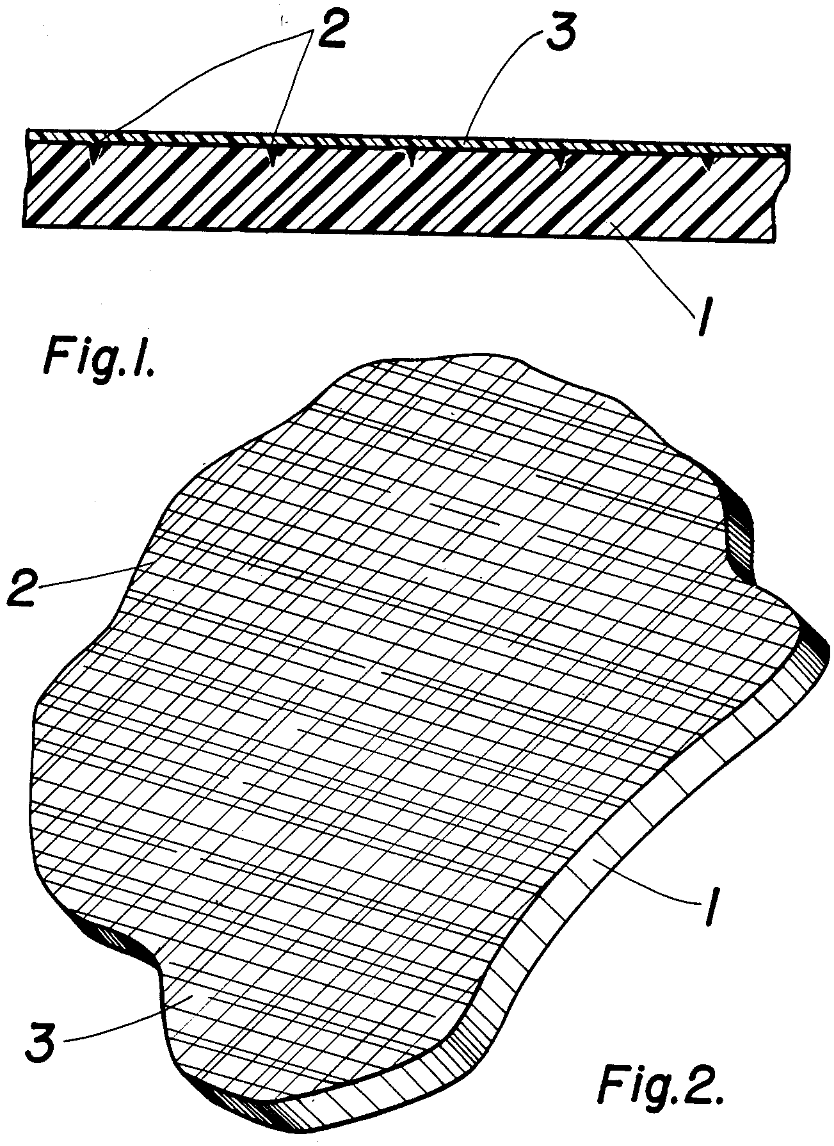
Figure 3:
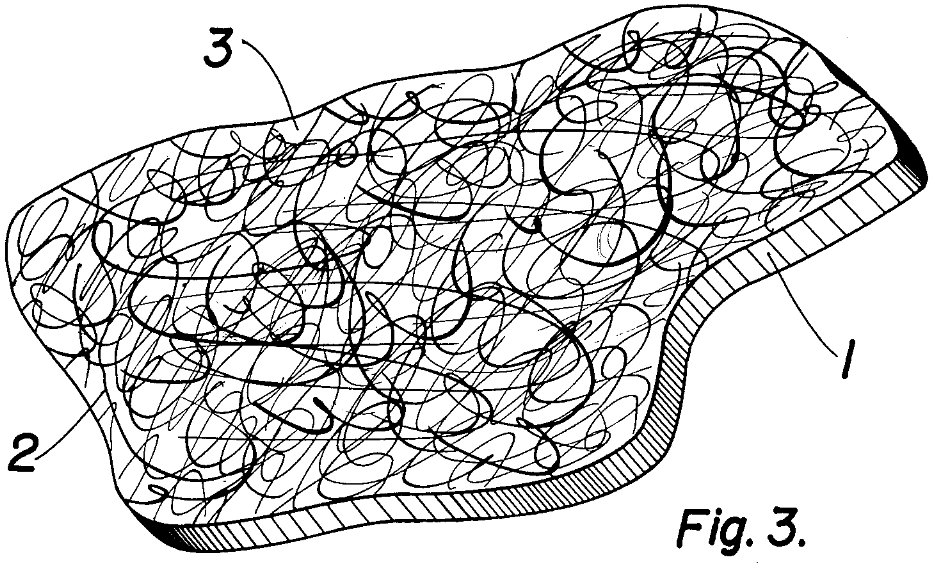
Figure 4:
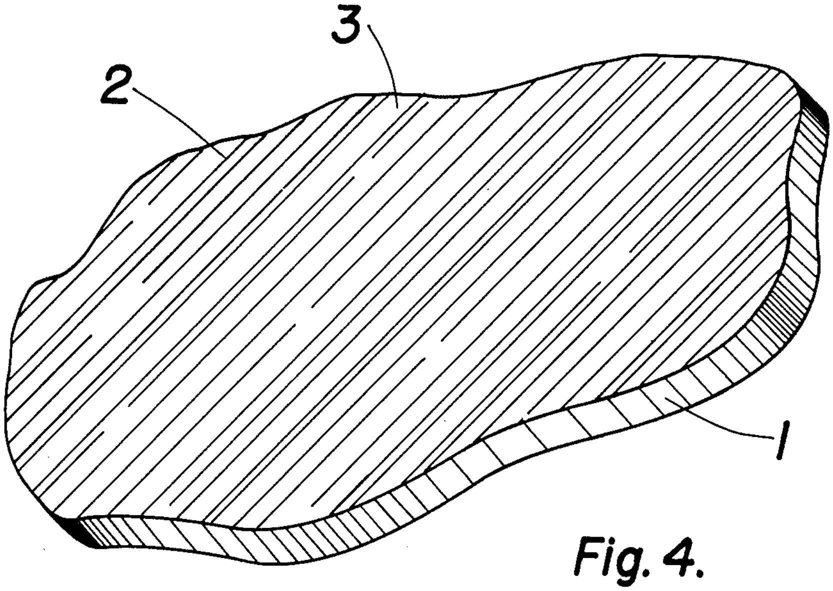
Figure 5:
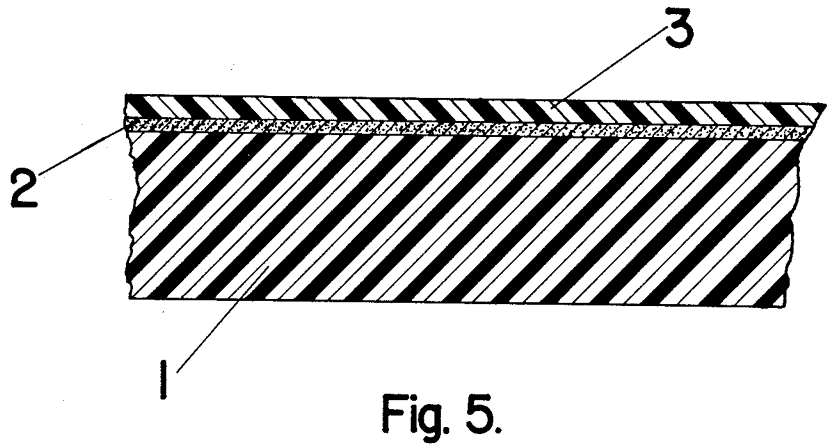
Figure 5 shows a section, in which some conductivity is obtained by a thin layer of graphite sealed in on the surface even in the absence of scratches.
Figure 6:
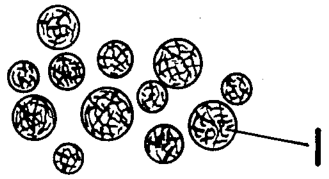
Figure 6 shows round balls of molding granules of polystyrene scratched by rolling with an abrasive and subsequently rolled with graphite, the excess of which was then blown off. These balls will mold into a transparent conductive plastic.
Figure 7:
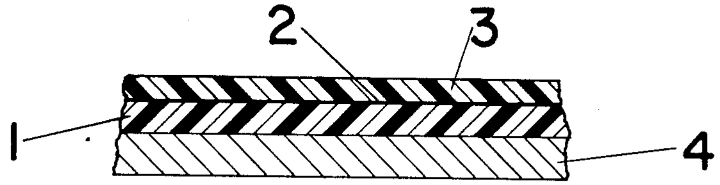

Figure 7 shows a metal base 4, coated with a plastic layer 1 on to which the conductive material is bonded as indicated above and sealed in by means of an electrically penetrable coating 3.

The same invention can also be applied to the molding of transparent conductive plastics. If small lumps, granules, balls, etc. of a normally non-conductive plastic, such as for example, polystyrene, are blasted or rolled with an abrasive, so as to form scratches in them, for example, by means of a Szegvary attritor, blower, ball mill, or the like, and subsequently rubbed with a conductive powder, such as graphite, so that the powder lodges in these scratches, such balls may then be molded into a substantially conductive transparent plastic.

Where reference is made to megohms or ohms, it is intended to indicate the usual electrical practice of measuring resistance in megohms or ohms per square.

As for the coated base material, the most important embodiments contemplated are considering transparent base materials, and are taking advantage of the fact that the transparency of 50% or better transmission for ordinary light is readily attainable by the application of this invention. Such transparent base materials may be, for example, sulfone resins from reaction products of sulfur dioxide, and 1- or 2-isobutenes, polystyrene, polyacrylates and methacrylates, silicone containing plastic, such as, polysiloxanes, polysilanes, fluorine-containing plastics, such as, polychloro trifluoro ethylene, poly tetrafluoro ethylene, polyfluoro acrylic acid, cellulose isobutyrate, cellulose acetate, ethyl cellulose, polyvinyl alcohol, polyacrylonitrile, polyvinyl or vinylidene chloride, and the co-polymers of the above, as well as alkyd resins—briefly, all types of transparent polymer materials, and further, glass and related transparent ceramic substances, including also quartz and mica.

However, we may also use any solid material that is a non-conductor, including organic substances such as wood and even metal surfaces coated with non-conductive coating materials made from any of the above plastics or other known coating substances, to which the above described surface treatment has been applied.

It is thus apparent that this invention is broad in scope and is not to be restricted excepting by the claims, in which it is our intention to cover all novelty inherent in this invention as broadly as possible, in view of prior art.

Having thus described our invention, we claim:

1. An article of manufacture comprising a non-conducting substance having fine surface scratches, said scratches being filled with electrically conducting solids, so as to impart to the said article a surface resistance in the range of 10 ohms to 1000 megohms, being further covered by a thin film comprising a polyelectrolyte and adherent to the said base material.

2. An article of manufacture comprising a non-conducting surface having surface scratches, said scratches being filled with a continuous electrical conductor obtained by fusing a deposit of fine particles of conducting material in said scratch, the said fine particles comprising a metal melting below 1100 degrees C. as a principal ingredient and the said conducting material having a fusing temperature below the fusing temperature of the said non-conducting substance.

3. An article of manufacture comprising a non-conducting substance provided with fine scratches in the surface thereof, said scratches being filled with electrically conducting solids and said surface being covered by a thin film comprising a polyelectrolyte adherent to said non-conducting substance.

4. An article of manufacture comprising a non-conducting substance provided with fine scratches in the surface thereof, said scratches being filled with electrically conducting solids and said surface being covered by a thin film comprising copolymerized methyl methacrylate and methacrylic acid.

5. An article of manufacture comprising a non-conducting surface having surface scratches, said scratches being filled with a continuous electrical conductor obtained by fusing a deposit of fine particles of conducting material in said scratches, the said conducting material having a fusing temperature below the fusing temperature of the said non-conducting substance, further covered by a thin film having a resistance less than 7,000 megohms per square, adherent to said non-conducting surface.

6. An article of manufacture comprising a non-conducting surface having surface scratches, said scratches being filled with a continuous electrical conductor obtained by fusing a deposit of fine particles of conducting material in said scratch, the said conducting material having a fusing temperature below the fusing temperature of the said non-conducting substance, further covered by a thin film comprising a polyelectrolyte and adherent to the said non-conducting surface.

7. The article of claim 2 wherein said conducting material comprises silver.

8. The article of claim 2 wherein said conducting material comprises lead.

References Cited in the file of this patent

UNITED STATES PATENTS

| | | |
|---|---|---|
| 1,445,610 | Brockway | Feb. 13, 1923 |
| 2,104,384 | Harris | Jan. 4, 1938 |
| 2,330,782 | Morelock | Sept. 28, 1943 |
| 2,371,379 | Clarke | Mar. 13, 1945 |
| 2,400,746 | Fassiotto et al. | May 21, 1946 |

OTHER REFERENCES

Curtiss: "Lacquer-Coated Resistors," Review of Scientific Instruments, December 1933, pp. 679 and 680.